US008984222B2

(12) United States Patent
Chandra et al.

(10) Patent No.: US 8,984,222 B2
(45) Date of Patent: Mar. 17, 2015

(54) METHODS AND STRUCTURE FOR TASK MANAGEMENT IN STORAGE CONTROLLERS OF A CLUSTERED STORAGE SYSTEM

(75) Inventors: Rakesh Chandra, Santa Clara, CA (US); James A. Rizzo, Austin, TX (US); Vinu Velayudhan, Fremont, CA (US); Senthil M. Thangaraj, Fremont, CA (US); Sumant K. Patro, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 176 days.

(21) Appl. No.: 13/432,131

(22) Filed: Mar. 28, 2012

(65) Prior Publication Data

US 2013/0067161 A1   Mar. 14, 2013

Related U.S. Application Data

(60) Provisional application No. 61/532,585, filed on Sep. 9, 2011.

(51) Int. Cl.
*G06F 12/02* (2006.01)
*G06F 3/06* (2006.01)
(Continued)

(52) U.S. Cl.
CPC .............. *G06F 3/0631* (2013.01); *G06F 13/12* (2013.01); *G06F 13/28* (2013.01); *G06F 3/0613* (2013.01); *G06F 3/0635* (2013.01); *G06F 3/0683* (2013.01); *G06F 2206/1012* (2013.01);
(Continued)

(58) Field of Classification Search
CPC ...................... H04L 29/06; G06F 2009/45579; G06F 3/061; G06F 3/0683; G06F 3/0622; G06F 3/0659; G06F 3/067; G06F 13/12; G06F 13/1642; G06F 13/423; G06F 21/554; G06F 2206/1012; G06F 3/0613; G06F 3/0631; G06F 3/0635; G06F 3/065; G06F 13/28; G06F 3/0647; G06F 3/0689
USPC .................................................. 711/114, 162
See application file for complete search history.

(56) References Cited

U.S. PATENT DOCUMENTS 6,105,080 A   8/2000 Holt et al.
6,487,646 B1   11/2002 Adams et al.
(Continued)

OTHER PUBLICATIONS

"Common RAID Disk Data Format Specification" Version 2.0 Revision 19 SNIA Technical Position Mar. 27, 2009.
(Continued)

*Primary Examiner* — Hashem Farrokh
(74) *Attorney, Agent, or Firm* — Duft Bornsen & Fettig

(57) ABSTRACT

Methods and structure for task management in storage controllers of a clustered storage system. An initiator storage controller of the clustered storage system ships I/O requests for processing to a target storage controller of the system. Responsive to a need to abort a previously shipped I/O request, the initiator storage controller transmits a task management message to the target storage controller. The task management message identifies one or more previously shipped I/O requests to be aborted. The target storage controller processes the received task management message in due course of processing requests and completes processing for the aborted previously shipped request in an orderly manner. Resources associated with the aborted previously shipped requests are release within both controllers.

20 Claims, 6 Drawing Sheets

(51) Int. Cl.
*G06F 13/12* (2006.01)
*G06F 13/28* (2006.01)
*G06F 13/42* (2006.01)

(52) U.S. Cl.
CPC .............. *G06F 3/065* (2013.01); *G06F 3/067* (2013.01); *G06F 13/423* (2013.01)
USPC .......................................... 711/114; 711/162

(56) References Cited

U.S. PATENT DOCUMENTS

| | | |
|---|---|---|
| 6,651,154 B1 | 11/2003 | Burton et al. |
| 6,738,870 B2 | 5/2004 | Huben et al. |
| 6,738,872 B2 * | 5/2004 | Van Huben et al. ........... 711/150 |
| 6,754,739 B1 | 6/2004 | Kessler et al. |
| 6,944,785 B2 | 9/2005 | Gadir et al. |
| 7,058,846 B1 | 6/2006 | Kelkar et al. |
| 7,082,390 B2 | 7/2006 | Bergsten |
| 7,213,102 B2 | 5/2007 | Buchanan, Jr. et al. |
| 7,418,550 B2 | 8/2008 | Hetrick et al. |
| 7,480,941 B1 | 1/2009 | Balasubramaniam et al. |
| 7,571,215 B2 * | 8/2009 | Jacobs et al. .................. 709/208 |
| 7,814,065 B2 | 10/2010 | Chan et al. |
| 7,971,094 B1 | 6/2011 | Benn et al. |
| 8,041,735 B1 | 10/2011 | Lacapra et al. |
| 8,190,816 B2 | 5/2012 | Balasubramanian |
| 8,261,003 B2 | 9/2012 | Young et al. |
| 8,370,571 B2 | 2/2013 | Mazina |
| 8,380,885 B1 * | 2/2013 | Natanzon .......................... 710/5 |
| 2002/0103964 A1 | 8/2002 | Igari |
| 2003/0065865 A1 * | 4/2003 | Nakamura et al. ............. 710/305 |
| 2004/0148477 A1 | 7/2004 | Cochran |
| 2004/0205074 A1 | 10/2004 | Berkery et al. |
| 2004/0243737 A1 * | 12/2004 | Beardsley et al. .............. 710/22 |
| 2005/0080874 A1 | 4/2005 | Fujiwara |
| 2005/0097324 A1 | 5/2005 | Mizuno |
| 2005/0125557 A1 | 6/2005 | Vasudevan et al. |
| 2005/0188421 A1 | 8/2005 | Arbajian |
| 2005/0240928 A1 | 10/2005 | Brown et al. |
| 2006/0080416 A1 | 4/2006 | Gandhi |
| 2006/0143506 A1 | 6/2006 | Whitt et al. |
| 2007/0015589 A1 | 1/2007 | Shimizu |
| 2007/0067497 A1 | 3/2007 | Craft et al. |
| 2007/0088928 A1 | 4/2007 | Thangaraj et al. |
| 2007/0210162 A1 | 9/2007 | Keen et al. |
| 2007/0288568 A1 * | 12/2007 | Hayter .......................... 709/204 |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0250699 A1 | 9/2010 | Brown |
| 2010/0274977 A1 | 10/2010 | Schnapp et al. |
| 2011/0072228 A1 | 3/2011 | Nagata |
| 2011/0178983 A1 | 7/2011 | Bernhard et al. |
| 2011/0225371 A1 | 9/2011 | Spry |
| 2011/0314325 A1 * | 12/2011 | Nakayama et al. ............ 714/4.2 |
| 2012/0159646 A1 | 6/2012 | Hong Chi et al. |
| 2012/0216299 A1 | 8/2012 | Frank |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR TASK MANAGEMENT IN STORAGE CONTROLLERS OF A CLUSTERED STORAGE SYSTEM

BACKGROUND

1. Field of the Invention

The invention relates generally to clustered storage systems and more specifically relates to methods and structure for task management among a plurality of storage controllers in a clustered storage system.

2. Related Patents

This patent application is related to the following commonly owned United States patent applications, all filed on the same date herewith and all of which are herein incorporated by reference:

- U.S. patent application Ser. No. 13/432,213, entitled METHODS AND STRUCTURE FOR IMPROVED PROCESSING OF I/O REQUESTS IN FAST PATH CIRCUITS OF A STORAGE CONTROLLER IN A CLUSTERED STORAGE SYSTEM;
- U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;
- U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;
- U.S. patent application Ser. No. 13/432,232, entitled METHODS AND STRUCTURE FOR IMPLEMENTING LOGICAL DEVICE CONSISTENCY IN A CLUSTERED STORAGE SYSTEM;
- U.S. patent application Ser. No. 13/432,238, entitled METHODS AND STRUCTURE FOR IMPROVED I/O SHIPPING IN A CLUSTERED STORAGE SYSTEM;
- U.S. patent application Ser. No. 13/432,220, entitled METHODS AND STRUCTURE FOR MANAGING VISIBILITY OF DEVICES IN A CLUSTERED STORAGE SYSTEM;
- U.S. patent application Ser. No. 13/432,150, entitled METHODS AND STRUCTURE FOR IMPROVED BUFFER ALLOCATION IN A STORAGE CONTROLLER; and
- U.S. patent application Ser. No. 13/432,138, entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

In such a clustered storage system, shipping of I/O requests from one controller to another presents numerous coordination and synchronization issues. For example, the controller that initially receives an I/O request (that will be shipped) acts in the role of a target device (e.g., in a SCSI protocol transfer) in receiving the request from an attached host system but acts in the role of an initiator device when shipping the request to another storage controller (the target device of the shipped request). Both the initiator and target storage controllers may utilize various portions (e.g., "layers") of their respective control logic in processing such a shipped I/O request. For example, a logical or physical device management layer may be utilized within the target storage controller to process the received, shipped I/O request. A "lower" layer for protocol management may be utilized within the target storage controller in communicating with the storage devices to be accessed. This protocol layer (e.g., another instance of the protocol layer) may also be utilized in communicating with the initiator storage controller to exchange data associated with a shipped request between the target controller and the host system. In like manner, similar layers of the initiator storage controller will be utilized in conjunction with the target controller and the host system. For example, protocol layers of the initiator controller may be involved in the exchange of data associated with the shipped request between the target storage controller and the host system. Or, for example, other layers of the initiator controller may await completion information from the target controller to report the completion status back to the requesting host system.

The initiator and target storage controllers generally operate independently of one another. Further, the various processing layers within each storage controller may also operate largely independent of one another as various requests may be in process within a controller at any given time. Thus, a number of coordination and synchronization issues arise in such a context.

One particularly vexing synchronization problem arises in the context of aborting one or more such shipped I/O requests. If a shipped request is to be aborted (for any of a variety of reasons), it is difficult to synchronize potentially several layers of processing in both the initiator and target storage controllers to properly abort the I/O request and to release resources utilized by both storage controllers in processing the aborted, shipped I/O request.

Thus it is an ongoing challenge to manage the aborting of I/O requests in the context of a clustered storage system where I/O requests may be shipped among the various storage controllers of the clustered storage system.

SUMMARY

The present invention solves the above and other problems, thereby advancing the state of the useful arts, by providing methods and structure for task management in storage controllers of a clustered storage system. An initiator storage controller of the clustered storage system ships I/O requests for processing to a target storage controller of the system. Responsive to a need to abort a previously shipped I/O request, the initiator storage controller transmits a task management message to the target storage controller. The task management message identifies one or more previously shipped I/O requests to be aborted. The target storage controller processes the received task management message in due course of processing requests and completes processing for the aborted previously shipped request in an orderly manner. Resources associated with the aborted previously shipped requests are release within both controllers.

On aspect hereof provides a method operable in a clustered storage system comprising an initiator storage controller and a target storage controller. The method comprises receiving an I/O request in the initiator storage controller from an attached host system and shipping the I/O request from the initiator storage controller to the target storage controller for processing. The method then determines, within the initiator controller, that the shipped I/O request is to be aborted and transmits a task management message from the initiator storage controller to the target storage controller. The task management message indicates that the shipped I/O request is to be aborted. The method completes processing of the shipped I/O request within the target storage controller responsive to receipt of the task management message and returns a completion status from the target storage controller to the initiator storage controller. The method then returns the completion status from the initiator storage controller to the host system.

In another aspect hereof, another method is provided operable in a clustered storage system comprising an initiator storage controller and a target storage controller. The method comprises shipping one or more I/O requests received at the initiator storage controller to the target storage controller as shipped I/O requests. The method then detects one or more of: a timeout in the initiator storage controller waiting for processing of one or more shipped I/O requests by the target storage controller, and an error condition in processing of the one or more shipped I/O requests. Responsive to the detection, the method transmits a task management message from the initiator storage controller to the target storage controller. The task management message comprises one or more of: an Abort Request message, an Abort All Requests message, a Reset Logical Device message, and a Reset Controller message. The method then aborts one or more processes within the target storage controller corresponding with each of the one or more shipped I/O requests responsive to receipt of the task management message. The method then completes each of the one or more shipped I/O request within the target storage controller responsive to the aborting of the one or more processes. The step of completion comprises applying a completion signal to the initiator storage controller indicative of the completion. The method then releases resources within the target storage controller relating to processing of each of the one or more shipped I/O requests responsive to completing processing of the one or more shipped I/O requests. The method also releases resources within the initiator storage controller relating to processing of the one or more shipped I/O requests responsive to receipt of the completion signal.

Yet another aspect hereof provides a clustered storage system comprising an initiator storage controller adapted to receive I/O requests from an attached host system and a target storage controller adapted to couple with one or more storage devices and communicatively coupled with the initiator storage controller. The initiator storage controller comprises an initiator protocol processing component adapted to communicate with the target storage controller and the target storage controller comprises a target protocol processing component adapted to communicate with the initiator storage controller. The initiator storage controller is adapted to ship one or more received I/O requests to the target storage controller as shipped I/O requests. The initiator controller is adapted to detect one or more of: a timeout in the initiator storage controller waiting for processing of one or more shipped I/O requests by the target storage controller, and an error condition in processing of the one or more shipped I/O requests. The initiator controller, responsive to the detection, is adapted to transmit a task management message to the target storage controller. The task management message comprises one or more of: an Abort Request message, an Abort All Requests message, a Reset Logical Device message, and a Reset Controller message. The target storage controller is adapted to abort one or more processes corresponding with each of the one or more shipped I/O requests responsive to receipt of the task management message. The target storage controller is adapted to complete processing of each of the one or more shipped I/O request responsive to the aborting of the one or more processes. The completion comprises applying a completion signal to the initiator storage controller indicative of the completion. The target storage controller is adapted to release resources within the target storage controller relating to processing of each of the one or more shipped I/O requests responsive to completing processing of the one or more shipped I/O requests. The initiator storage controller is adapted to release resources within the initiator storage controller relating to processing of the one or more shipped I/O requests responsive to receipt of the completion signal.

DETAILED DESCRIPTION OF THE DRAWINGS

Figure 1:
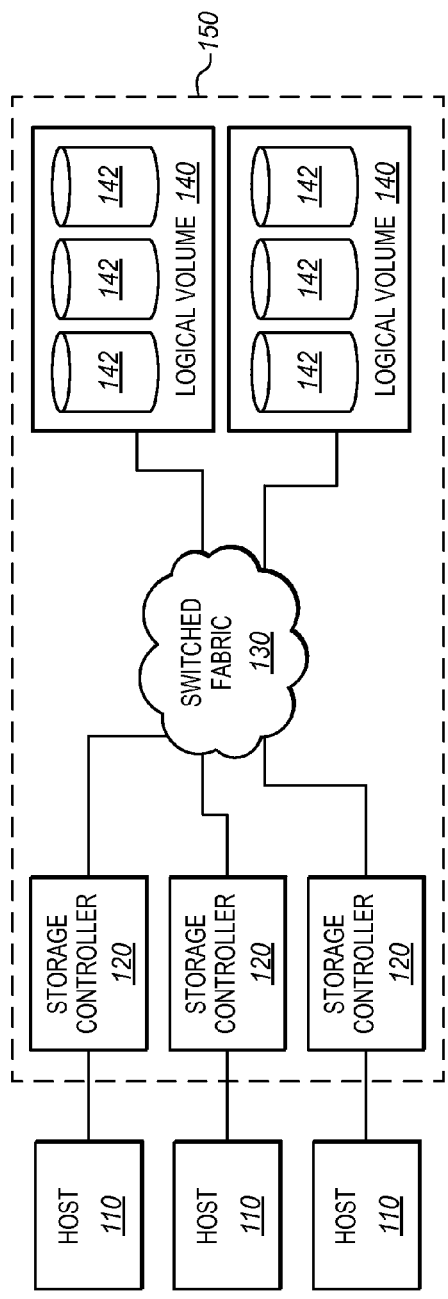
FIG. 1 is a block diagram illustrating an example of a prior art clustered storage system.
Figure 2:
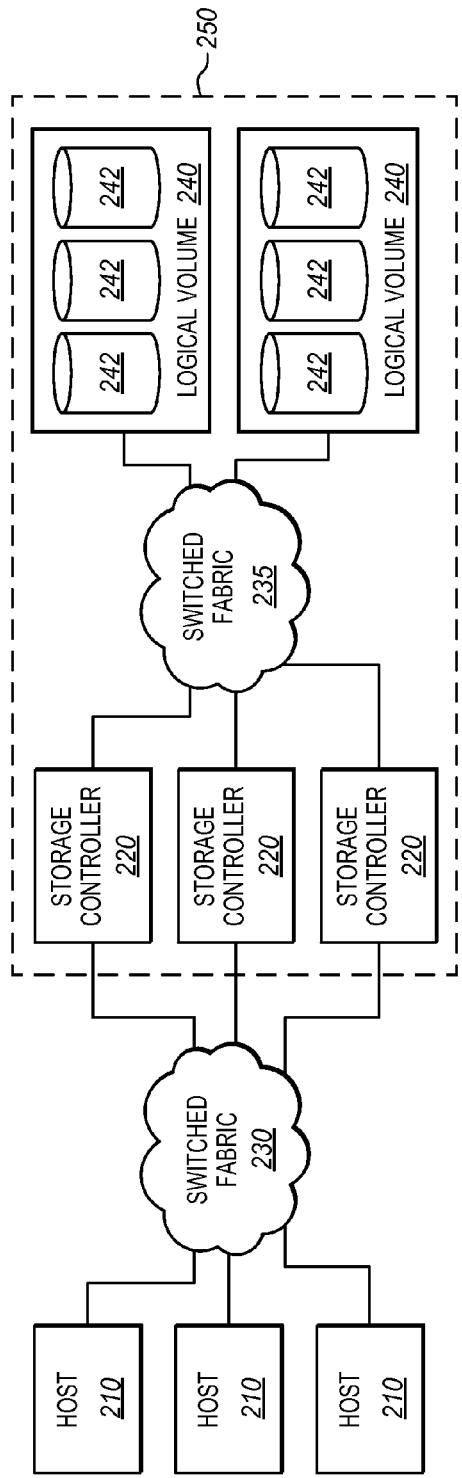
FIG. 2 is a block diagram illustrating another example of a prior art clustered storage system.
Figure 3:
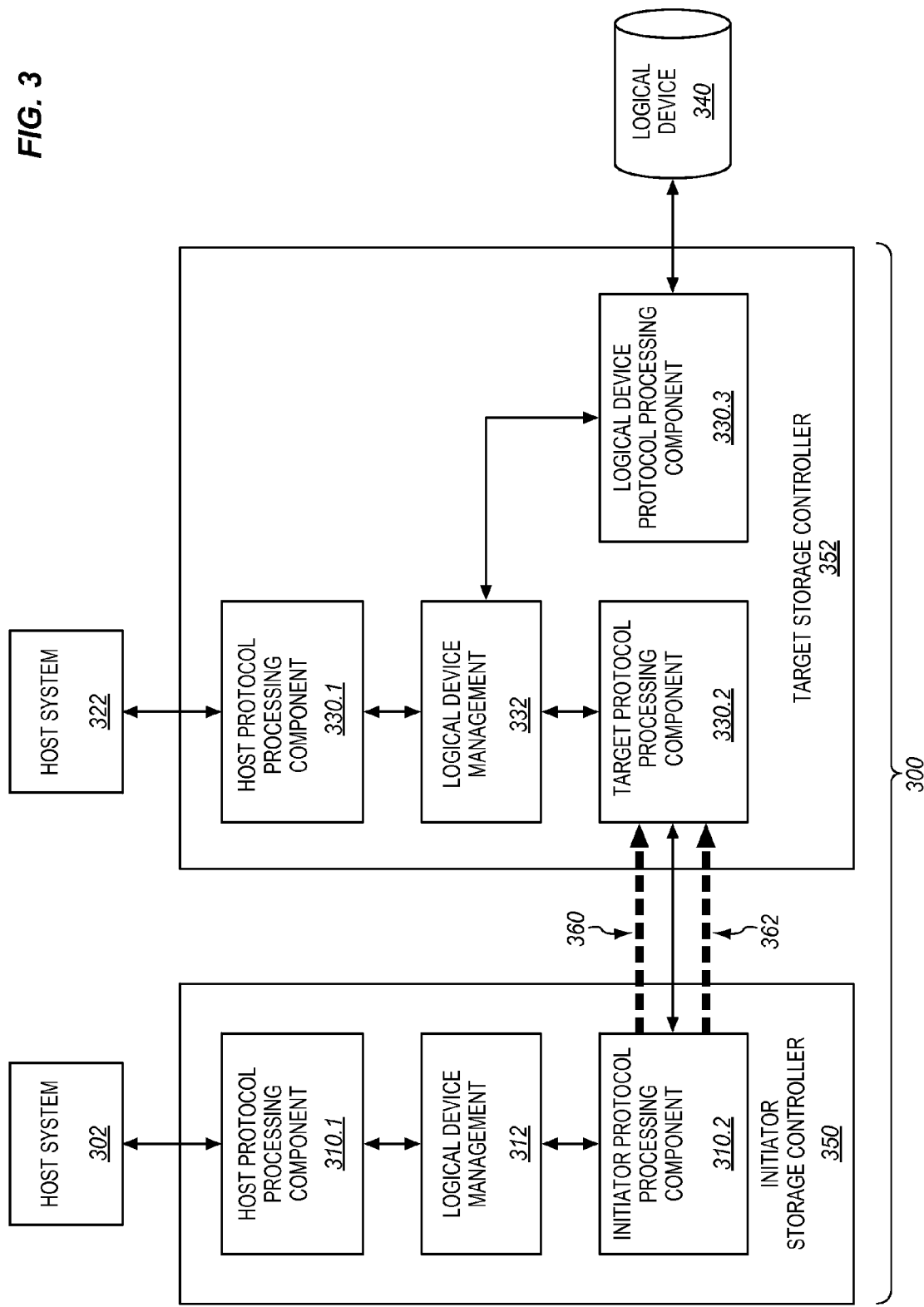
FIG. 3 is a block diagram of an exemplary clustered storage system enhanced in accordance with features and aspects hereof to use task management messages sent from an initiator storage controller to a target storage controller to coordinate aborting of shipped I/O requests.

FIG. 3 is a block diagram of an exemplary clustered storage system 300 enhanced in accordance with features and aspects hereof to better manage completion and cleanup for aborted, shipped I/O requests utilizing a task management messaging protocol. System 300 comprises an initiator storage controller 350 adapted to couple with one or more host systems 302 and comprises target storage controller 352 adapted to couple with one or more host systems 322. The storage controllers 250 and 352 are enhanced to utilize task management messages to coordinate requests to abort further processing of I/O requests previously shipped from one storage controller to another.

Each storage controller (350 and 352) may comprise a suitable number of protocol processing components, each associated with a corresponding communication link and each adapted for the specific communication medium and protocol for its intended communications. For example, initiator storage controller 350 may comprise host protocol processing component 310.1 adapted for coupling the controller with host system 302. Such a host coupling may utilize any of a variety of well-known commercially available communication media and protocols including, for example, Fibre Channel (FC), Peripheral Component Interconnect (PCI), PCI Express, SAS, Ethernet, etc. Further, initiator storage controller 350 may comprise initiator protocol processing component 310.2 adapted to couple initiator storage controller 350 with target storage controller 352. This inter-controller coupling may likewise utilize any of a variety of well-known communication media and protocols including, FC, SAS, Ethernet, Infiniband, etc. In particular, the inter-controller coupling may preferably utilize a switched fabric coupling such as SAS, FC, and Ethernet such that all storage controllers and all storage devices of the clustered storage system are inter-connected.

Target storage controller 352 may similarly comprise host protocol processing component 330.1 adapted to couple controller 352 with one or more locally attached host systems 322. Target storage controller 352 may further comprise target protocol processing component 330.2 adapted to couple target storage controller 352 with initiator storage controller 350 via its corresponding initiator protocol processing component 310.2 (i.e., providing an inter-controller communication path). Target storage controller 352 may also couple with one or more logical storage devices 340 through corresponding logical device protocol processing component 330.3.

All such processing protocol processing components (310.1, 310.2, 330.1, 330.2, and 330.3) may comprise any suitable interface circuits and processors for coupling with a corresponding component utilizing any of several well-known, commercially available communication media and protocols. Further, each such protocol processing component may comprise suitably programmed instructions for utilizing such communication media and protocol interface circuits. The programmed instructions may be executed by any suitable general or special purpose processor (not shown) within each of storage controller 350 and storage controller 352.

Initiator storage controller 350 may further comprise logical device management 312 and target storage controller 352 may further comprise logical device management 332. Each such logical device management component comprises any suitably programmed instructions and/or suitably designed custom circuits adapted for receiving and processing I/O requests generated by attached host systems. Such a logical device management component may comprise, for example, a RAID storage management component adapted for receiving and processing I/O requests from host systems directed to RAID logical volumes (i.e., logical device 340) and adapted to receive and process shipped I/O requests received from another storage controller of the system.

In operation, in general, an I/O request received from an attached host system may be received via a corresponding protocol processing component (e.g., from a locally attached host system or shipped from another storage controller of the clustered storage system). The received request is processed by the logical device management component of the storage controller receiving the I/O request. The logical device management component may analyze the received I/O request (e.g., a "parent request") and generate one or more corresponding lower level requests (e.g. "child requests") directed toward specific physical storage devices that comprise or provision the identified logical device of the parent request. The analysis may comprise, for example, logical to physical mapping processing as well as RAID redundancy processing. The lower-level (child) requests may then be transmitted to the storage devices that comprise or provision the identified logical device through a corresponding logical device protocol processing component of the storage controller.

As generally known to those of ordinary skill in the art, in the clustered storage environment, a first storage controller (i.e., initiator storage controller 350) may ship a received I/O request to a second storage controller (e.g., target storage controller 352). As noted above, significant complexity can arise when the initiator storage controller determines that, for any of various reasons, such a shipped I/O request must be aborted. Thus, system 300 is enhanced in accordance with features and aspects hereof such that a shipped I/O request may be more easily aborted by use of task management messages transmitted from the initiator storage controller to the target storage controller.

As shown in FIG. 3, logical device management 312 may determine that a received I/O request should be shipped to target storage controller 352. Responsive to such a determination, logical device management 312 utilizes initiator protocol processing component 310.2 to transmit the I/O request to target protocol processing component 330.2 of target storage controller 352 (as indicated by bolded dashed arrow 360). Responsive to receipt of such a shipped request, target storage controller 352 transfers the shipped I/O request to logical device management 332 for appropriate analysis and processing within target storage controller 352. In particular, logical device management 332 may generate one or more child requests directed to storage devices that comprise logical device 340 and transmit the child requests via logical device protocol processing component 330.3 to the affected storage devices of logical device 340.

Asynchronously with respect to processing of a shipped I/O request, initiator storage controller 350 may determine, for any of various reasons, that a previously shipped I/O request should be aborted. Or, again for various reasons, initiator storage controller 350 may determine that all shipped I/O requests directed to a particular logical device should be aborted or that all shipped I/O requests directed to any logical device should be aborted. In addition, initiator storage controller 350 may determine that a particular logical device associated with shipped I/O requests to be aborted should be reset. Still further, initiator storage controller 350 may determine that all shipped I/O requests should be aborted and that target storage controller 352 should be reset. The various conditions that may give rise to each of these decisions may vary according to particular applications. However, in general, error and timeout conditions as well as administrative directions may give rise to these various determinations.

All such requests may be generated as task management messages by logical device management 312 of initiator storage controller 350. The generated task management messages are then transmitted utilizing the same initiator protocol processing component 310.2 transmitting the task management message to target protocol processing component 330.2 as indicated by bolded dashed line 362. Task management messages may therefore be received using the same communication path for receiving shipped I/O requests within target storage controller 352. Much like a received shipped I/O request (or an I/O request received from locally attached host system 322), the task management message may be transferred from target protocol processing component 330.2 up to logical device management 332 to be processed by all layers of logic of target storage controller 352. In some exemplary embodiments, the task management messages, received shipped I/O request, and I/O requests received from locally attached host systems 322 may all be added to a common queuing structure within target storage controller 352. Thus, all layers of processing associated with one or more shipped I/O requests to be aborted may be properly synchronized with other processing of target storage controller 352. Further, each layer of processing associated with an aborted, shipped I/O request may release any resources in the normal course of its processing when the task management message is encountered indicating that a shipped I/O request is to be aborted. When all such processing within target storage controller 352 is completed responsive to receipt of the task management message (e.g., aborted and resources released), appropriate completion status information may be returned to initiator storage controller 350 so that it may also release any resources associated with a previously shipped I/O request (now aborted).

Those of ordinary skill in the art will readily recognize numerous additional and equivalent elements in a clustered storage system such as system 300. Further, one of ordinary skill will recognize various additional and equivalent elements in storage controllers 350 and 352. Such additional and equivalent elements are omitted herein for simplicity and brevity of this discussion.

Figure 4:
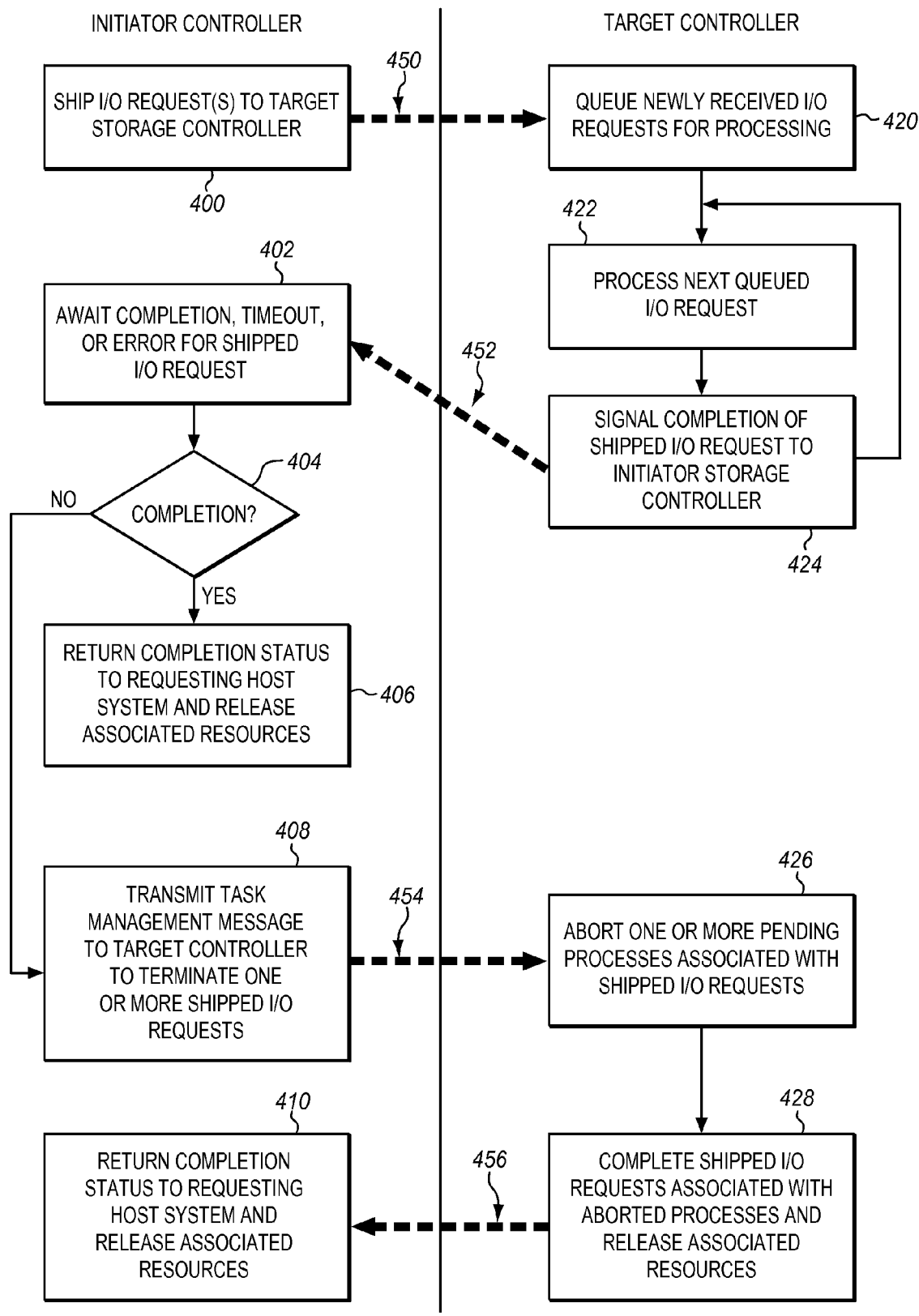
FIGS. 4 through 7 are flowcharts describing exemplary methods in accordance with features and aspects hereof to use task management messages sent from an initiator storage controller to a target storage controller to coordinate aborting of shipped I/O requests.

FIG. 4 is a flowchart describing exemplary methods for improved processing to abort shipped I/O requests in the context of a clustered storage system. The method of FIG. 4 is operable, for example, in clustered storage system 300 of FIG. 3 and more specifically may be operable in initiator storage controller 350 and target storage controller 352 of system 300 of FIG. 3.

At step 400, the initiator storage controller determines that a received I/O request is to be shipped to a target storage controller for processing within the clustered storage system. As noted above, such a determination to ship an I/O request may result from needs for balancing the load among storage controllers of clustered storage system and/or from planned or unplanned failover of a storage controller of the clustered storage system. Dashed arrow 450 represents appropriate communications between the initiator storage controller and the target storage controller to communicate information relating to the shipped I/O request. Step 420, operable within the target storage controller, queues the newly received, shipped I/O request for further processing in due course within the target storage controller. Steps 422 and 424 represent continuing iterative processing within target storage controller to process all queued I/O requests. Queued request may include locally received or generated I/O requests as well as shipped I/O request received from the initiator storage controller. Further, as noted below, queued request may also comprise task management messages to abort one or more previously shipped I/O requests.

When any shipped I/O request is completed in the normal order of processing of target storage controller, an appropriate completion status message is returned to the initiator storage controller as indicated by dashed arrow 452.

Returning to operation of the initiator storage controller, step 402 awaits receipt of a completion status message or, in case of some error condition, a timeout or an error indicator associated with a previously shipped I/O request. When some event satisfies the wait of step 402, step 404 next determines whether the wait was terminated by receipt of a completion status message from the target storage controller indicating successful completion of a previously shipped I/O request. If so, step 406 returns the received completion status message to the requesting host system and releases all resources within the initiator storage controller associated with the shipped I/O request now completed. Alternatively, if the wait of step 404 is terminated by some timeout or error condition associated with a previously shipped I/O request, step 408 generates and transmits a task management message to the target storage controller requesting termination (aborting) of one or more previously shipped I/O requests. Transmission of the generated task management message is indicated by dashed arrow 454.

Responsive to receipt of such a task management message, step 426 is operable within the target storage controller to abort one or more processes (presently active processes or pending processes) associated with one or more shipped I/O requests identified as to be aborted by the received task management message. Having so aborted processes, step 428 completes the shipped I/O requests by returning appropriate completion status information to the initiator storage controller as indicated by dashed line 456. Further, step 428 operable within the target storage controller releases any resources associated with the aborted, shipped I/O request within the target storage controller.

Returning again to operation of the initiator storage controller, step 410 returns an appropriate completion status to the requesting host system (e.g., indicating either successful completion or successful abortive termination of the identified I/O requests). Further, step 410 releases any resources within the initiator storage controller associated with the shipped, now aborted, I/O request. By utilizing synchronous task management messages transmitted from the initiator storage controller to the target storage controller, the target storage controller may perform appropriate processing to abort one or more identified, previously shipped I/O requests in its normal course of processing thus dramatically simplifying coordination between the initiator storage controller and target storage controller and simplifying coordination among layers of processing within each storage controller to process a request to abort previously shipped I/O requests.

Figure 5:
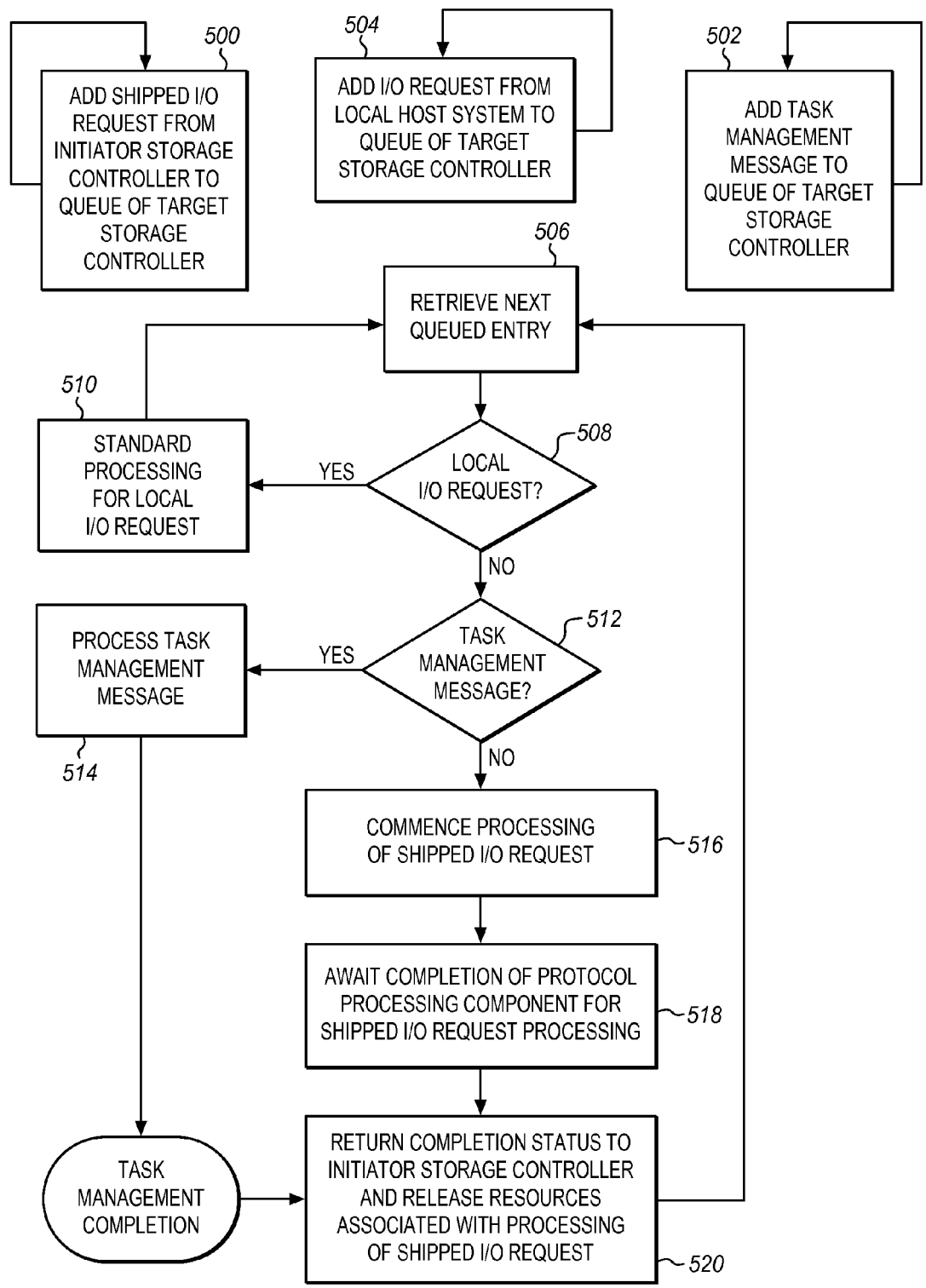

FIG. 5 is a flowchart describing another exemplary method for improved coordination between an initiator storage controller and a target storage controller when aborting previously shipped I/O requests. The method of FIG. 5 may be operable in an enhanced clustered storage system such as system 300 of FIG. 3 and more specifically may be operable within the target and initiator storage controllers (352 and 350, respectively) of FIG. 3. Steps 500, 502, and 504 represent asynchronous events within the clustered storage system each of which adds processing to be performed by the target storage controller of the clustered storage system. Specifically, step 500 represents the addition of a shipped I/O request to the queue of the target storage controller responsive to receiving a shipped I/O request from the initiator storage controller. In like manner, step 502 represents processing to add a task management message to the queue of operations to be performed by the target storage controller. Such a task management message may be received from the initiator storage controller for purposes of aborting previously shipped I/O requests. Lastly, step 504 represents processing to add an I/O request generated by a locally attached host system to the queue of operations to be performed by the target storage controller. In some exemplary embodiments, all such processing requests may be stored within a common queue of the target storage controller to be processed in due course. In particular, the task management messages received from an initiator storage controller may be added to a queue in common with received shipped I/O requests such that shipped requests that preceded receipt of the task management message may be appropriately aborted while other shipped requests received after the task management message may be left in the queue of pending operations. In other exemplary embodiments, queues of tasks may be separated such that the order of processing of queued requests may be prioritized as required by the target storage controller. A next task/request to be executed by the target storage controller may then be selected from an appropriate queue based on a priority of the various queues or other selection criteria.

Steps 506 through 520 then represent processing of each request queued in the queue (or queues) of operations to be performed by the target storage controller. At step 506, a next queued entry is retrieved (and removed) from a queue of the target storage controller. If the queue/queues happen to be empty, step 506 awaits receipt of a next entry added to a queue of operations to be performed. Having retrieved a next entry representing a next processing task to be performed, step 508 determines whether the retrieved operation represents an I/O request received from a locally attached host system (i.e., a "local I/O request"). If so, step 510 represents all processing required to compete a locally received I/O request (i.e., standard I/O request processing within the target controller). Such standard processing is generally well known to those of ordinary skill in the art and beyond the scope of the present discussion. Upon completion of all processing for a locally received I/O request, the process continues looping back to step 506 to await receipt and/or retrieval of a next queued entry.

If the next queued entry just retrieved is not a locally generated I/O request, step 512 next determines whether the retrieved entry indicates a task management message received from the cooperating initiator storage controller. If so, step 514 performs all processing relating to the received task management message. In particular, step 514 represents processing of the target storage controller to abort any processes presently being performed or awaiting execution on behalf of one or more I/O requests to be aborted as specified by the received task management message. Further details of the processing step 514 are provided herein below with respect to other figures. Based on completion of the processing of the task management message, step 520 returns an appropriate completion status to the initiator storage controller and releases all resources within the target storage system associated with processing of the received task management message. Processing then continues looping back to step 506 to await receipt and/or retrieval of a next queued entry.

If step 512 determines that the un-queued entry is neither a locally generated I/O request nor a task management message, the un-queued entry represents a shipped I/O request received from an initiator storage controller. Step 516 therefore commences processing of the shipped I/O request by generating appropriate child I/O requests based on the logical to physical mapping associated with the logical device identified in the shipped I/O request. The generated child I/O requests are then transmitted to an appropriate protocol processing component of the controller to communicate with affected storage devices. In accordance with normal processing of such a shipped I/O request, step 518 awaits receipt of completion status information regarding the various child I/O requests generated by operation of step 516. Upon receipt of such completion information, step 520 returns a completion status indicator to the initiator storage controller and releases any resources associated with processing of the on queued task representing a shipped I/O request.

Figure 6:
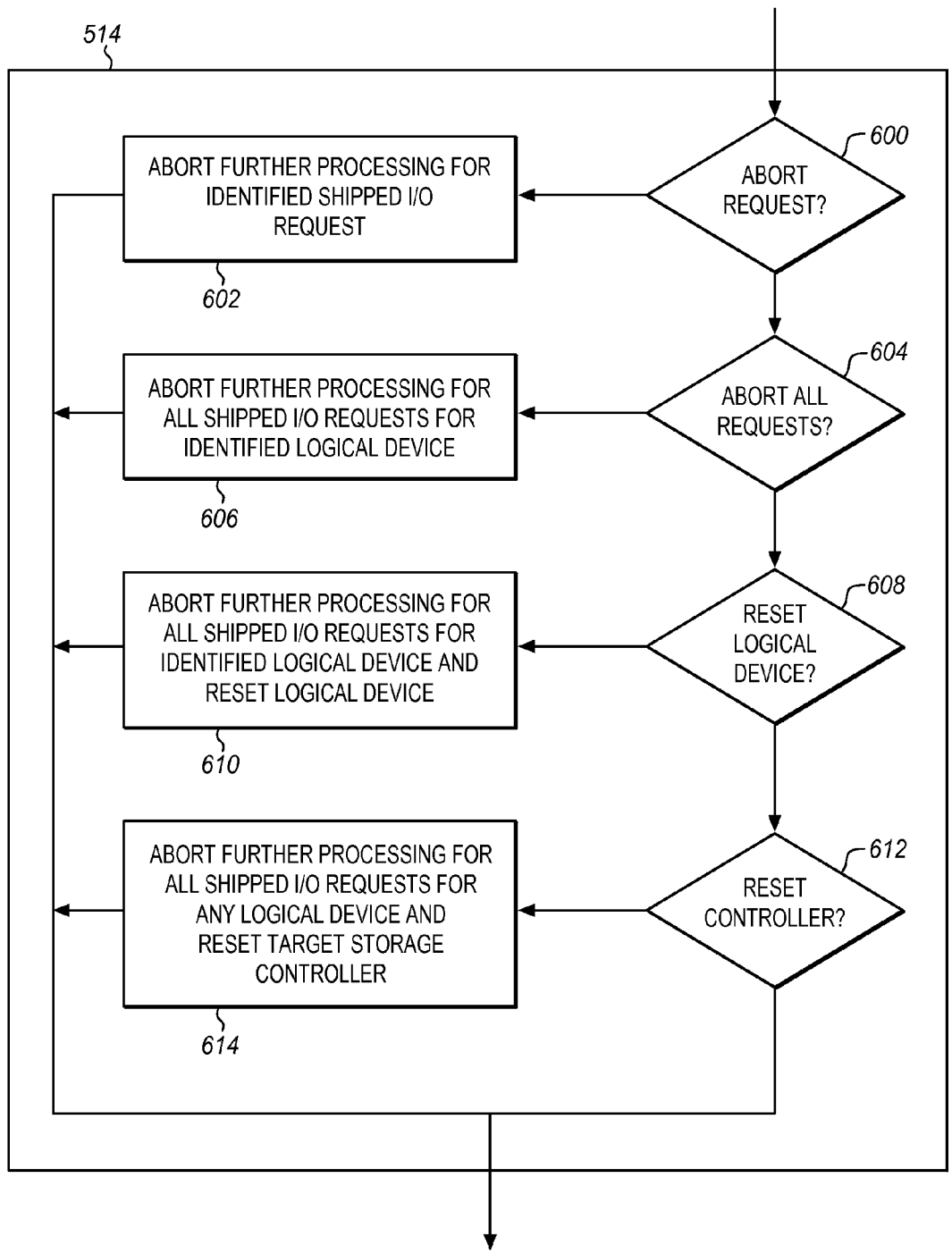

FIG. 6 is a flowchart describing exemplary additional details of the processing of step 514 of FIG. 5. Step 514 of FIG. 5 generally represents all processing relating to execution of a received task management message from an initiator storage controller's. In general, as discussed above, such a task management message requests aborting of processes relating to one or more identified shipped I/O requests. Where the initiator storage controller determines that a previously shipped I/O request needs to be aborted, the initiator storage controller transmits a task management message and step 514 processes such a message in due course of processing within the target storage controller.

At step 600, the received task management message is tested to determine whether it represents an "Abort Request Message". If so, step 602 represents all processing relating to such an "Abort Request Message" requesting the aborting of a specific, identified, previously shipped I/O request. In like manner, step 604 determines whether the task manager message is requesting aborting of all requests for an identified logical device (an "Abort All Requests Message"). If so, step 606 represents all processing for aborting of all shipped I/O requests associated with a particular identified logical device. Step 608 likewise determines whether the received task management message represents a request to reset an identified logical device (a "Reset Logical Device Message"). If so, step 610 represents all processing for such a task management message to abort all previously shipped I/O requests for an identified logical device followed by a reset of the identified logical device. Step 612 determines whether the task management message is a "Reset Controller Message" requesting aborting of further processing for all shipped I/O requests for any logical devices of the target storage controller and a full reset of the target storage controller.

The above discussed task management messages are merely exemplary of certain useful messages for coordinating processing between an initiator storage controller and a target storage controller to manage aborting of shipped I/O requests. Those of ordinary skill in the art will recognize a variety of additional and alternative task management messages that may be useful in particular applications. Further, the specific types of messages received depend on the specific type of error sensed by the initiator storage controller.

Figure 7:
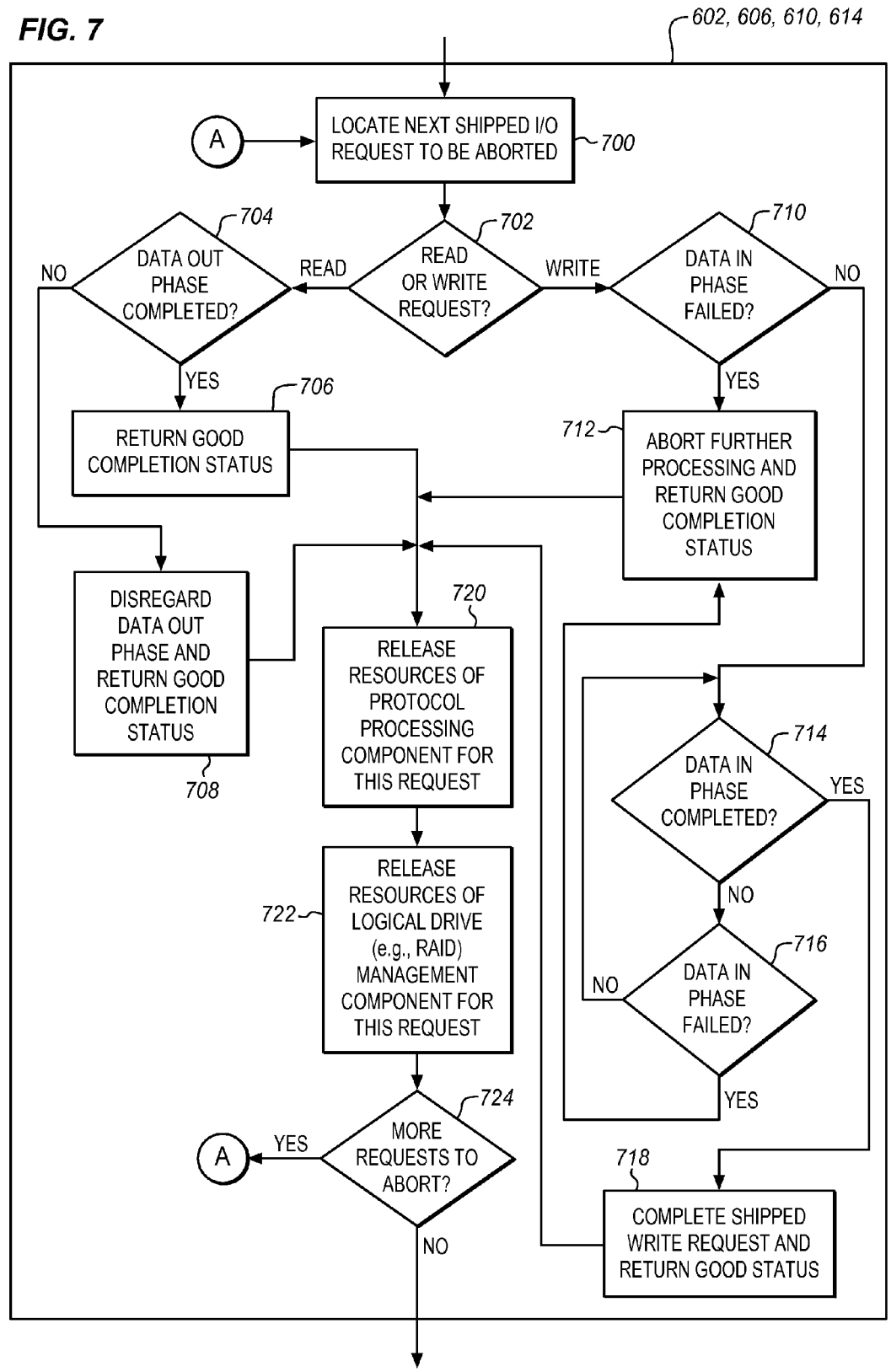

FIG. 7 is a flowchart describing exemplary additional details of the processing of steps 602, 606, 610, and 614 discussed above with respect to FIG. 6. The method of FIG. 6 is generally operable in a target storage controller for processing of a received task management usage from an initiator storage controller. Each of the various exemplary task management messages discussed above essentially comprises aborting of processes relating to one or more previously shipped I/O request. For some such task management messages, only a single identified request is aborted while for other task management messages a plurality of previously shipped I/O requests may be aborted. Thus, the processing of FIG. 7 represents exemplary additional details of all such abortive processing requests to abort either for a single identified shipped I/O request or to abort some identified plurality of requests.

Step 700 locates a next shipped I/O request to be aborted. The specific task management message may either identify a particular previously shipped I/O request (e.g., utilizing SCSI tag values such as ITTP values or other suitable identification information). Further, the I/O request to be next aborted may be identified based on a particular logical device identified by the task management message. For example, an Abort All Requests task management message requests that each shipped I/O request associated with an identified logical device should be aborted rather than identifying each individual shipped I/O request to be aborted (e.g., by SCSI tag values). At step 702, the next located request to be aborted is tested to determine whether it is a read or a write request. If the request to be aborted is a read request, step 704 next determines whether a DATA OUT phase of the read request has already been completed. In processing a read shipped I/O request, the target storage controller seeks the requested data in the identified logical device. The initiator storage controller is prepared to receive the requested data (for forwarding the requesting host system) in a direct memory access (DMA) DATA OUT phase of the request processing. If step 704 determines that the DATA OUT phase of the shipped request being aborted has already completed, step 706 simply returns a good completion status (e.g., for the logical device management layer of the target controller and for the various processing layers of the initiator storage controller that shipped the request). Processing then continues at step 720 as discussed below. If step 704 determines that the DATA OUT phase has not yet completed, further processing for the DATA OUT phase may be ignored (e.g., it may later complete with or without a failure). Since the initiator storage controller has requested that the shipped I/O request is to be aborted, it is irrelevant whether the DATA OUT phase completes—the initiator storage controller is already finished with its processing of the I/O request being aborted. Processing then continues at step 720 as discussed further below.

If step 702 determines that the shipped request to be aborted was a write request, step 710 determines whether the DATA IN phase for the write request has already failed. In processing a write shipped I/O request, the target storage controller seeks the requested location in the identified logical device. The initiator storage controller is prepared to transmit the write data from the host system to the target storage controller in a DMA DATA IN phase of the request processing. If step 710 determines that the DATA OUT phase of the shipped request being aborted has already failed, step 712 aborts any further processing for the DATA IN phase and returns a good completion status for all further processing of the shipped write request. Processing then continues at step 720 as discussed further below.

If step 710 determines that the DATA IN phase has not yet failed, steps 714 and 716 are iteratively operable to await a completion of the DATA IN phase—either with a successful completion where the data is written to the logical device or with a failure because the initiator storage device has already aborted its operations to transfer the write date from the host system to the target storage controller. If step 714 detects that the DATA IN phase has successfully completed, step 718 returns a good completion status to complete the shipped write request. If step 716 determines that the DATA IN phase has failed, step 712 returns a good completion status though the data may not have been written since the initiator storage controller has already performed its processing to abort the request. In both cases, processing continues at step 720.

Step 720 releases all resources of the protocol processing component within the target storage controller relating to processing of the now aborted, shipped I/O request. Step 722 likewise releases all resources of the logical drive management component of the target storage controller relating to processing of the shipped I/O request. Step 724 then determines whether another shipped I/O request is to be aborted based on the task management message being processed (as in steps 602, 606, 610, and 614 of FIG. 6). If further shipped I/O requests are to be aborted, processing continues looping back top step 700 (label "A") to locate and retrieve another shipped I/O request to be aborted.

Those of ordinary skill in the art will recognize numerous additional and equivalent steps that may be present in the methods of FIGS. 4 through 7. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a Redundant Array of Independent Drives (RAID) clustered storage system comprising an initiator storage controller and a target storage controller, wherein the initiator storage controller comprises an initiator RAID management processing component communicatively coupled with an initiator protocol processing component, wherein the target storage controller comprises a target RAID management processing component communicatively coupled with a target protocol processing component, and wherein the initiator protocol processing component is communicatively coupled with the target protocol processing component, the method comprising:
- receiving an I/O request in the initiator storage controller from an attached host system;
- shipping the I/O request from the initiator storage controller to the target storage controller for processing;
- determining, within the initiator controller, that the shipped I/O request is to be aborted;
- transmitting a task management message from the initiator protocol processing component of the initiator storage controller to the target protocol processing component of the target storage controller, the task management message indicating that the shipped I/O request is to be aborted;
- completing processing of the shipped I/O request within the target storage controller responsive to receipt of the task management message;
- returning a completion status from the target storage controller to the initiator storage controller; and
- returning the completion status from the initiator storage controller to the host system.

2. The method of claim 1 wherein the step of completing further comprises releasing resources within the target storage controller relating to processing of the shipped I/O request.

3. The method of claim 1 wherein the I/O request is shipped via the initiator protocol processing component.

4. The method of claim 1 wherein the step of completing further comprises completing a data transfer phase for the shipped command by operation of the target protocol processing component, wherein the data transfer phase comprises exchange of data associated with the shipped I/O request between the target storage controller and the host system via the initiator protocol processing component.

5. The method of claim 4 where the shipped I/O request is a write request, the step of completing the data transfer phase further comprises:
- determining whether the data transfer phase has stopped with an error condition;
- responsive to determining that the data transfer phase has stopped, completing the shipped I/O request by aborting the data transfer phase;
- responsive to determining that the data transfer phase has not stopped, completing the shipped I/O request by completing the data transfer phase; and
- releasing resources within the target storage controller related to processing of the shipped I/O request.

6. The method of claim 4 where the shipped I/O request is a read request, the step of completing the data transfer phase further comprises:
- completing the return of read data associated with the read request from the target protocol processing component to the initiator protocol processing component; and
- releasing resources within the target storage controller related to processing of the shipped I/O request.

7. The method of claim 1 wherein the step of determining further comprises detecting a timeout condition in the initiator storage controller awaiting completion processing by the target storage controller of a shipped I/O request.

8. The method of claim 1 wherein the step of determining further comprises detecting an error in processing by the target storage controller of a shipped I/O request.

9. The method of claim 1 wherein the step of transmitting further comprises transmitting a task management message comprising one or more of: an Abort Request message, an Abort All Requests message, a Reset Logical Device message, and a Reset Controller message.

10. A method operable in a clustered storage system comprising an initiator storage controller and a target storage controller, wherein the initiator storage controller comprises an initiator protocol processing component coupled with an initiator request processing component, wherein the target storage controller comprises a target protocol processing component coupled with a target request processing component, and wherein the target protocol processing component and the initiator protocol processing component are communicatively coupled, the method comprising:
- shipping one or more I/O requests received at the initiator storage controller to the target storage controller as shipped I/O requests;
- detecting one or more of: a timeout in the initiator storage controller waiting for processing of one or more shipped I/O requests by the target storage controller, and an error condition in processing of the one or more shipped I/O requests;
- responsive to the detection, transmitting a task management message from the initiator protocol processing component of the initiator storage controller to the target protocol processing component of the target storage controller, wherein the task management message comprises one or more of: an Abort Request message, an Abort All Requests message, a Reset Logical Device message, and a Reset Controller message;
- aborting one or more processes within the target storage controller corresponding with each of the one or more shipped I/O requests responsive to receipt of the task management message;
- completing processing of each of the one or more shipped I/O requests within the target storage controller responsive to the aborting of the one or more processes, wherein the step of completion comprises applying a completion signal to the initiator storage controller indicative of the completion;
- releasing resources within the target storage controller relating to processing of each of the one or more shipped I/O requests responsive to completing processing of the one or more shipped I/O requests; and
- releasing resources within the initiator storage controller relating to processing of the one or more shipped I/O requests responsive to receipt of the completion signal.

11. The method of claim 10 wherein the one or more shipped I/O requests are shipped via the initiator protocol processing component.

12. The method of claim 10 wherein the step of aborting further comprises:
- aborting further processing in the target storage controller for an identified shipped I/O request of the one or more shipped I/O requests responsive to receipt of an Abort Request task management message wherein the Abort Request task management message indicates the identified request.

13. The method of claim 10 wherein the step of aborting further comprises:
- aborting further processing in the target storage controller for all shipped I/O requests of the one or more shipped I/O requests directed to an identified storage device responsive to receipt of an Abort All Requests task management message wherein the Abort All Requests task management message indicates the identified storage device.

14. The method of claim 10 wherein the step of aborting further comprises:
aborting further processing in the target storage controller for all shipped I/O requests of the one or more shipped I/O requests directed to an identified storage device and resetting the identified storage device responsive to receipt of a Reset Logical Device task management message wherein the Reset Logical Device task management message indicates the identified storage device.

15. The method of claim 10 wherein the step of aborting further comprises:
aborting further processing in the target storage controller for all shipped I/O requests and resetting the target storage controller responsive to receipt of a Reset Controller task management message.

16. A clustered storage system comprising:
an initiator storage controller adapted to receive I/O requests from an attached host system; and
a target storage controller adapted to couple with one or more storage devices and communicatively coupled with the initiator storage controller,
wherein the initiator storage controller comprises an initiator protocol processing component adapted to communicate with the target storage controller, and further comprises an initiator request processing component coupled with the initiator protocol processing component,
wherein the target storage controller comprises a target protocol processing component adapted to communicate with the initiator storage controller, and further comprises a target request processing component coupled with the target protocol processing component, wherein the target protocol processing component and the initiator protocol processing component are communicatively coupled,
wherein the initiator storage controller is adapted to ship one or more received I/O requests to the target storage controller as shipped I/O requests,
wherein the initiator controller is adapted to detect one or more of: a timeout in the initiator storage controller waiting for processing of one or more shipped I/O requests by the target storage controller, and an error condition in processing of the one or more shipped I/O requests,
wherein the initiator protocol processing component of the initiator controller, responsive to the detection, is adapted to originate and transmit a task management message to the target protocol processing component of the target storage controller, wherein the task management message comprises one or more of: an Abort Request message, an Abort All Requests message, a Reset Logical Device message, and a Reset Controller message,
wherein the target storage controller is adapted to abort one or more processes corresponding with each of the one or more shipped I/O requests responsive to receipt of the task management message,
wherein the target storage controller is adapted to complete processing of each of the one or more shipped I/O request responsive to the aborting of the one or more processes, wherein the completion comprises applying a completion signal to the initiator storage controller indicative of the completion,
wherein the target storage controller is adapted to release resources within the target storage controller relating to processing of each of the one or more shipped I/O requests responsive to completing processing of the one or more shipped I/O requests, and
wherein the initiator storage controller is adapted to release resources within the initiator storage controller relating to processing of the one or more shipped I/O requests responsive to receipt of the completion signal.

17. The system of claim 16 wherein the target storage controller is adapted to abort further processing in the target storage controller for an identified shipped I/O request of the one or more shipped I/O requests responsive to receipt of an Abort Request task management message wherein the Abort Request task management message indicates the identified request.

18. The system of claim 16 wherein the target storage controller is adapted to abort further processing in the target storage controller for all shipped I/O requests of the one or more shipped I/O requests directed to an identified storage device responsive to receipt of an Abort All Requests task management message wherein the Abort All Requests task management message indicates the identified storage device.

19. The system of claim 16 wherein the target storage controller is adapted to abort further processing in the target storage controller for all shipped I/O requests of the one or more shipped I/O requests directed to an identified storage device and resetting the identified storage device responsive to receipt of a Reset Logical Device task management message wherein the Reset Logical Device task management message indicates the identified storage device.

20. The system of claim 16 wherein the target storage controller is further adapted to abort further processing in the target storage controller for all shipped I/O requests and resetting the initiator storage controller responsive to receipt of a Reset Controller task management message.

* * * * *